US008284018B2

(12) United States Patent
Ibsies

(10) Patent No.: US 8,284,018 B2
(45) Date of Patent: Oct. 9, 2012

(54) AUTOMATED BATHROOM-STALL DOOR

(76) Inventor: Fadi Ibsies, Tigard, OR (US)

( * ) Notice: Subject to any disclaimer, the term of this patent is extended or adjusted under 35 U.S.C. 154(b) by 473 days.

(21) Appl. No.: 12/574,961

(22) Filed: Oct. 7, 2009

(65) Prior Publication Data

US 2011/0080252 A1 Apr. 7, 2011

(51) Int. Cl.
*G05B 23/02* (2006.01)

(52) U.S. Cl. .......................................................... 340/3.1

(58) Field of Classification Search .................. 340/3.1, 340/542, 5.7; 49/340; 70/91, 275
See application file for complete search history.

(56) References Cited

U.S. PATENT DOCUMENTS

| | | | | |
|---|---|---|---|---|
| 4,763,937 | A | 8/1988 | Sittnick, Jr. et al. | |
| 5,963,000 | A | 10/1999 | Tsutsumi et al. | |
| 6,108,975 | A | 8/2000 | Bailey | |
| 6,486,793 | B1 | 11/2002 | Buccola | |
| 6,967,587 | B2 | 11/2005 | Snell et al. | |
| 7,068,179 | B2 | 6/2006 | Snell et al. | |
| 7,234,201 | B2 | 6/2007 | Brown et al. | |
| 8,141,296 | B2 * | 3/2012 | Bem | 49/340 |
| 2002/0176607 | A1 * | 11/2002 | Bond et al. | 382/107 |

* cited by examiner

*Primary Examiner* — Vernal Brown
(74) *Attorney, Agent, or Firm* — Peter A Haas Esquire LLC

(57) ABSTRACT

A first proximity sensor array arranged on a first side of a stall-door comprises three linearly aligned sensors whereby left-to-right movement of a patron's hand within the sensing zone causes a bathroom stall door to open. A second proximity sensor array arranged on a second side of the stall door comprises three linearly aligned sensors whereby right-to-left movement of a patron's hand within the sensing zone causes the door to close. A second right-to-left movement across the same second sensor array causes the stall door to lock and a first display array arranged on the first side of the door and a second display array arranged on the second side of the door alight, indicating the stall is occupied and locked. A left-to-right movement across the second sensor array causes the stall door to unlock and open, and the display arrays indicate the stall is available.

5 Claims, 6 Drawing Sheets

FIG. 8
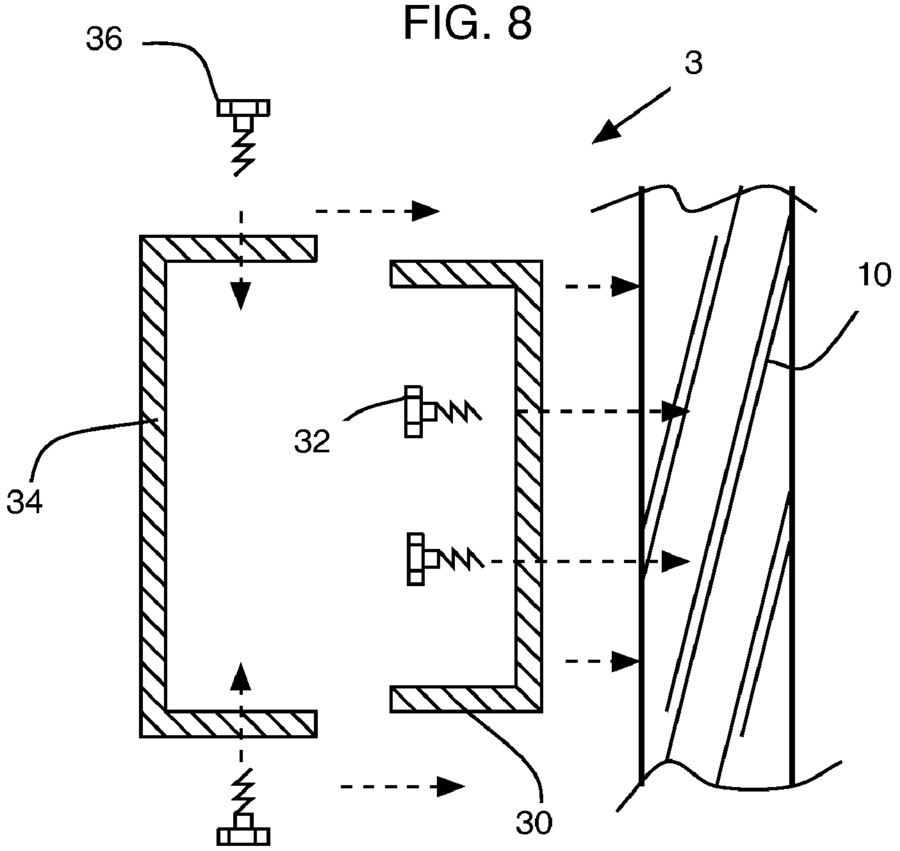
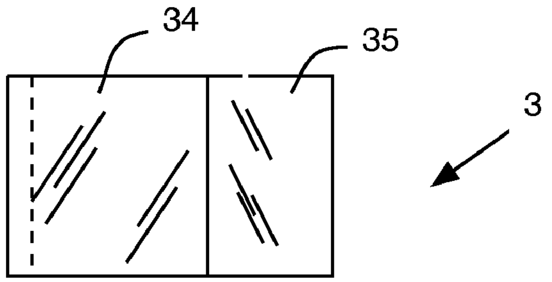
FIG. 9
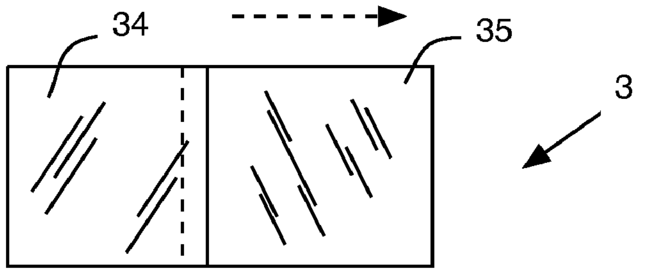
FIG. 10

AUTOMATED BATHROOM-STALL DOOR

FIELD OF THE INVENTION

This invention relate to an apparatus and method of use for automatically opening, closing, locking, and unlocking a door and more specifically for hands-free operation of a bathroom stall-door.

BACKGROUND

Recently, many devices and systems have been introduced to automate and render "hands-free" various operating fixtures of public bathrooms. From simple foot operated garbage can lids to removal of entry doors, varied attempts to render public bathrooms hygienic and eliminate hand-contact with fixtures has been limited to on-off, start-stop, or open-close operations of traditional facilities.

One attempt to provide a hands-free door-opening apparatus, described by Snell et al. in U.S. Pat. No. 7,068,179 on 27 Jun. 2006, includes an apparatus for automatically opening a swinging restroom door. It comprises an actuator, a control unit, and a power assisted drive mechanism and proximity sensor. This apparatus is applied to an exit/entry door to a bathroom and is not adapted for use on a stall-door and a patron waves his or her hand within the detection zone of the proximity sensor, this movement activates the door to open. Snell, however, does not contemplate adapting the apparatus for a stall-door, which typically is a much lighter door and lacks the physical space requirements for his apparatus. Further, not contemplated by Snell is the need for locking the stall door when occupied by a patron and indicating to waiting patrons that the stall is occupied.

Other attempts at hands-free operation of other bathroom fixtures include providing a sensor coupled to an activation mechanism whereby motion of a patron's hand within the proximity sensor's range causes towels to dispense from automated paper-towel dispensers, turns on a stream of water from a faucet, dollops a pre-determined amount of soap from a soap dispenser, or begins a time cycle activation of a heated hand dryer, for example. Motion sensors are also used to automate toilette flushing.

Yet, to date, no attempts have been made to successfully operate and lock "hands-free" a bathroom stall door. The traditional method of locking bathroom stall doors still requires the patron to contact a lever and bolt the door, or turn a cam to lock the stall-door. Further, there have been no successful attempts to enable hands-free opening and closing of the stall-door. The stall door presents problems and challenges not contemplated by any prior-art attempts to automate bathroom facilities functions. Thus, there remains a need for a device that can be fit to existing stall-doors or incorporated into new stall-doors that enables a patron to open and close the door hands-free and further to lock the door without contacting any surfaces. Further, such an improvement should also inform waiting patrons that the stall is occupied. Such an improvement should further include low power-consumption mechanisms and be easy to install and operate. Yet still another need is an easy-to-use device that enables disabled patrons to operate the stall door.

SUMMARY OF THE INVENTION

In a first preferred embodiment, the present invention comprises an improved apparatus for automatically opening, closing, locking, and unlocking a swinging bathroom stall door. This improved apparatus includes a first proximity sensor array comprising three linearly disposed sensors, each sensor further including a light-emitting-diode display device consisting of at least two colors, for example red and green, the first proximity sensor array arranging on a first side of the swinging door, that is outside-the-stall side of the door. And, a second proximity sensor array comprising three linearly disposed sensors, each sensor further including a light-emitting-diode display device consisting of at least two colors, the first proximity sensor array arranging on a second side of the swinging door, that is inside the stall. Further, a first actuator in electrical communication with the first and second proximity sensor arrays and coupled to a locking mechanism enables locking of the stall door when a patron moves the hand left to right and unlocking when the hand moves right to left. The display shows three green LEDs when the stall door is opened, unlocked, and the stall is unoccupied. A third sensor detects the presence of the patron inside the stall and prevents a second (waiting) patron from opening the door. When the stall is locked and occupied, three red LED lights illuminate.

Also, a second actuator in electrical communication with the first and second proximity sensor arrays and coupled to a door opening/closing mechanism. Accordingly, the same sensor array can be used to detect motion to lock, open, close, and unlock the door and a controller in electrical communication with the first and second proximity sensor arrays includes the requisite programming sequences to determine the desired affect of the motion of the patron's hand and can further determine if the motion is left to right or right-to-left. The controller, accordingly, includes memory, a power source (either hard-wired into the grid, or an on-board, self-contained source such as replaceable and/or rechargeable batteries or any combination), and soft and hard programming including a control logic sequence programming that enables a first sequence of signals received from at least one of the proximity sensor arrays to open the swinging door, a second sequence of signals to close the swinging door, a third sequence of signals to lock the door and a fourth sequence of signals to unlock the door. Finally, as discussed, the corresponding associated light-emitting-diode display device displays at least one color corresponding to the sequence of signals received by the controller.

In a second preferred embodiment, the present invention contemplates a method for hands-free operation of a bathroom stall door. This method for hands-free operation of a bathroom-stall door includes opening, closing, locking or unlocking, or any combination of the same. The method comprises: providing a first sensor array comprising three linearly aligned sensors arranged on a first side of the door; providing a first display array comprising three linearly aligned light-emitting diode devices arranged to correspond with the first sensor array; providing a second sensor array comprising three linearly aligned sensors arranged on a second side of the door; providing a second display array comprising three linearly aligned light-emitting diode devices arranged to correspond with the second sensor array; providing a controller adapted to couple to the door, the controller in bi-directional communication with each sensor array and each display array; providing a locking mechanism adapted to lock the stall door in response to a first predetermined sequence from the controller and adapted to unlock the stall door in response to a second predetermined sequence from the controller; displaying a first color sequence on the first display array according to the lock status of the door; and providing an actuator adapted to open the stall door in response to a third predetermined sequence from the controller and to close the stall door in response to a fourth predetermined sequence from the controller.

DRAWING

FIG. 8 is a side view of a possible mounting mechanism of the present invention.

FIG. 9 is a front view of a possible housing or shell of the present invention showing a first amount of overlap of two portions of the shell.

FIG. 10 is a second position of the embodiment of FIG. 9.

DESCRIPTION OF THE INVENTION

Figure 1:
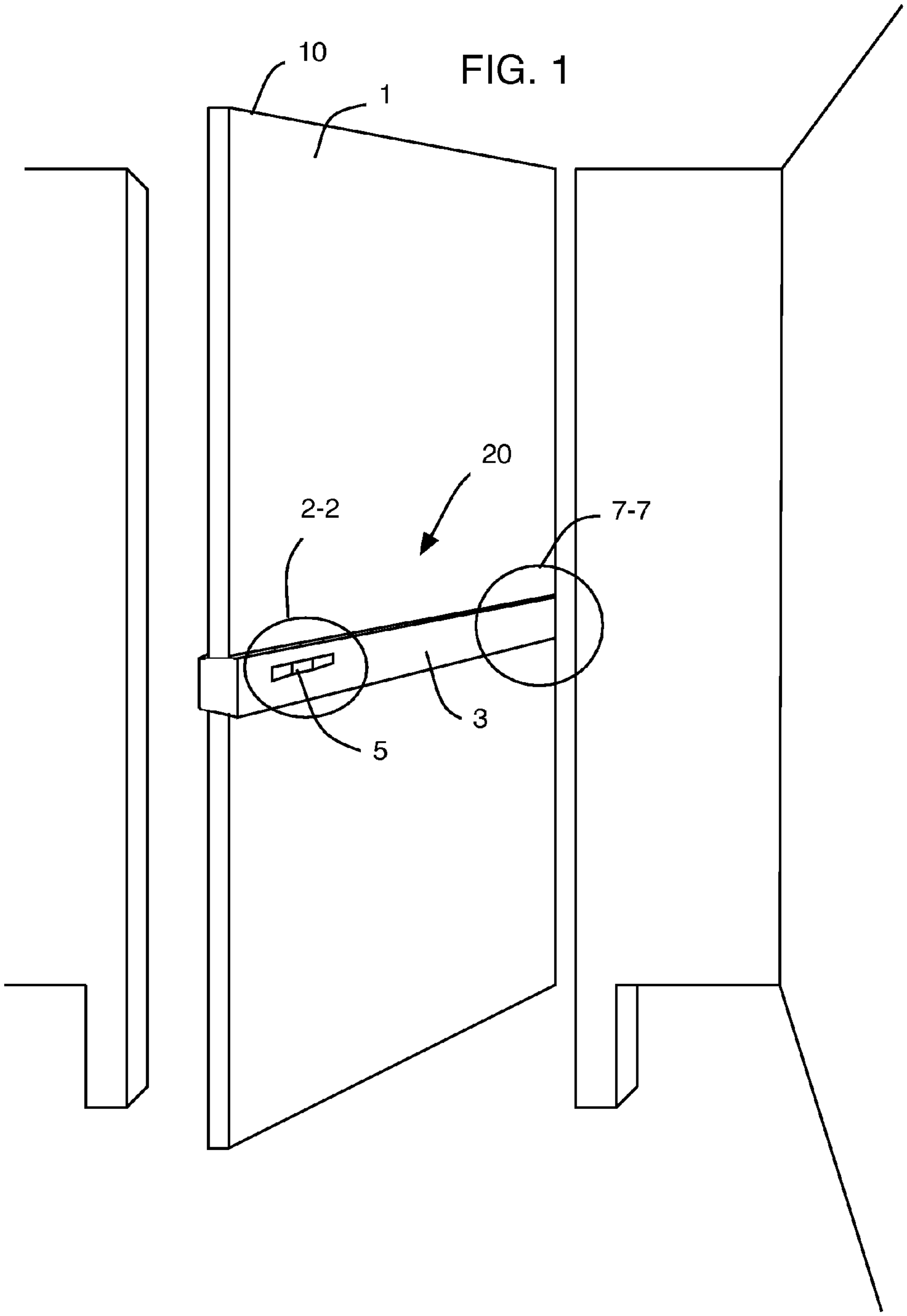
FIG. 1 illustrates a back view of a first preferred embodiment of the present invention in an environment of use.

Possible preferred embodiments will now be described with reference to the drawings and those skilled in the art will understand that alternative configurations and combinations of components may be substituted without subtracting from the invention. Also, in some figures certain components are omitted to more clearly illustrate the invention.

The present invention enables hands-free operation of a rest-room stall door from inside or outside and includes manual override from both sides. To prevent unintended opening of the stall-door the present invention includes sensors 14 to determine if the restroom stall is occupied. Accordingly, the improved apparatus 20 for automatically opening, closing, locking, and unlocking a swinging door includes a first actuator and power-assisted drive mechanism for opening and closing the door and a second actuator and associated power-assisted drive mechanism for locking and unlocking the door, a control unit, a power source (either on-board or remote) and a plurality of sensor units. Both power drive mechanisms include a corresponding limit unit in communication with the mechanical components for opening and locking the stall door so that manual operation can be affected without damage to the automatic components.

To operate the improved apparatus for automatically opening, closing, locking, and unlocking a swinging door in a hands-free mode, first, an interior sensor 14 must sense that the stall is unoccupied. The apparatus indicates an unoccupied status by illuminating an LED indicator 60 on the exterior of the door. Then, the patron places a hand in front of the left-most proximity sensor 63 on the exterior side of the door and then moves the hand from left to right passing in front of a series of three, serially aligned proximity sensors 63 65 67, as the hand moves, a corresponding sequence of three serially aligned LED indicators 64 66 68 illuminate in sequence. A series of signals corresponding to this sequence of left-to-right movement in front of the exterior proximity sensors is communicated to the controller, which, in turn, activates the door-opening/closing drive mechanism to open the stall door.

Once the patron is inside the stall, the patron waves the hand in front of the interior proximity sensors 5 in a right to left motion (passed the aligned sensors 51 53 55) and in a similar operation, the automated mechanism closes the door. With the door closed (so indicated by a closed door sensor in communication with the controller) and the stall activated a second right-to-left motion signals the controller to active the second mechanism that causes the door to lock and signals the exterior LED indicator to illuminate an "occupied" status.

To unlock and exit the stall, the patron waves the hand in a left-to-right motion and the door unlocks and opens in sequence with the single pass of the hand.

To assist operation with seeing-impaired patrons, an audible signal may be used to augment the illuminated LED indicators and to indicate registration of the swiping hand movement in front of the respective sequence of proximity sensors. The controller can be programmable to vary options of opening, closing, locking an unlocking. For example, the controller can be programmed to ignore commands to lock the stall door, or can be programmed to automatically lock the door upon receiving a "close door" sequence from the interior proximity sensors. Similarly, to unlock the door, the controller can be programmed to require a first and second swipe past the proximity sensors. The direction and duration of the swipe may be programmed as required to enable full customization of the apparatus.

In one preferred embodiment, a low-power apparatus is contemplated wherein on-board storage cells (batteries) draw current from ambient light from a solar panel on the door or connected to the apparatus. The batteries provide sufficient power to run the two actuators for opening/closing and locking/unlocking. In this manner, the apparatus is a self-contained unit that can be retrofitted to existing stall doors that use simple hinges (lacking any opening mechanism) and gravity to operate.

For example, a conventional rest-room stall door 10 is relatively light-weight and is attached to the adjoining stall-wall by a top and bottom hinge element. The weight of the door does not require a supplemental mechanism to assist opening or closing. The existing stall door is simply pulled or pushed open or closed. The present invention readily adapts to the conventional stall door and comprises an outer housing with a rigid shell and a variable shell adapted to fit varying widths of stall doors. There is an exterior side and interior side of the housing 3 corresponding to the orientation of the apparatus on a stall door 10.

This housing consists of a lightweight metal (such as aluminum or stainless steel) or tough plastic (such as ABS) material or other similar material common to commercial rest-room construction as would be well-understood in this art. The housing protects the various components from vandalism and unintentional damage from use in high-volume public restrooms.

FIG. 1 illustrates an interior perspective of a portion of a conventional public restroom stall including a stall-door 10 having an interior surface 1. A preferred embodiment of the present invention includes a hands-free operation module 20 for the stall door, of which a portion is mounted on the interior face 1 of the door 10. This interior portion of the module 20 includes a housing 3, at least a portion of which is a rigid shell segment or a plurality of overlapping segments (for example segments 34 and 35 of FIGS. 9 and 10) to accommodate varying widths of bathroom stall doors. The shell 3 includes a mounting plate 30 (See FIG. 8), which affixes to the stall door in a conventional manner, such as sheet-metal screws 32 fastening the plate to the door. The plate, moreover, may include a flange or flanges extending from the mounting surface outward to provide a mating surface for mounting a portion of the exterior 34 of the shell to the stall door via the flange and fasteners 36.

Relative to the interior face of the stall-door, the present invention 20 includes a shell disposed on a portion of the stall door and extending at least partially, or preferably across the entire width of the stall door. The shell 3 at a proximal end defined by the opening edge of the stall door includes a sensor and display array (indicated generally by the encircled detail labeled 2 in FIG. 1), while the opposite, distal end of the shell includes a mechanism for opening and closing the door (indicated generally by the encircled detail labeled 7 in FIG. 1).

Figure 3:
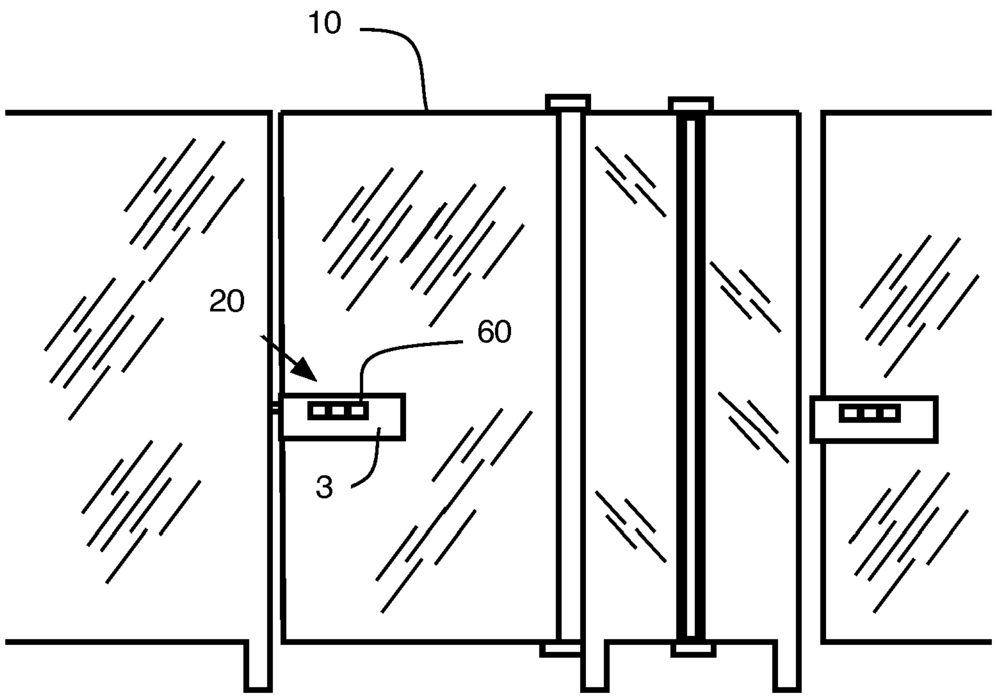
FIG. 3 is a front view of the first preferred embodiment of the present invention in an environment of use.
Figure 5:
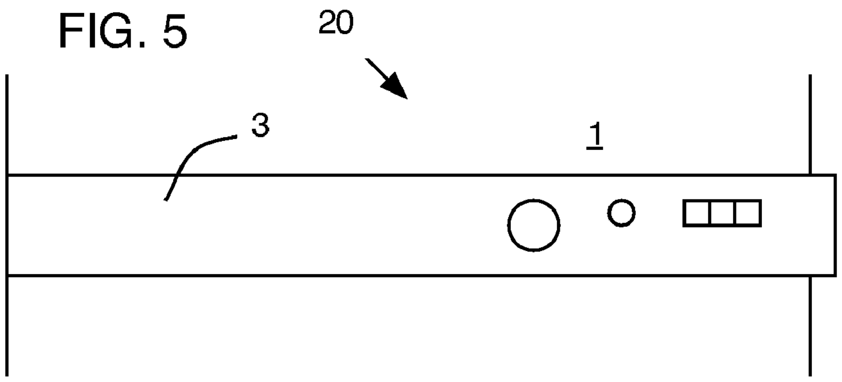
FIG. 5 is a top view of the embodiment of FIG. 4.
Figure 4:
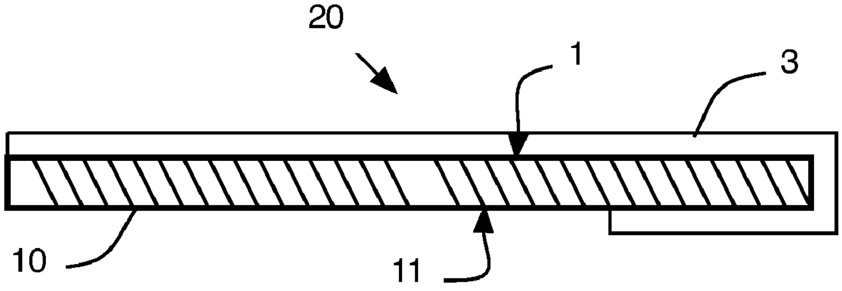
FIG. 4 is a front view of a second embodiment of the present invention.
Figure 6:
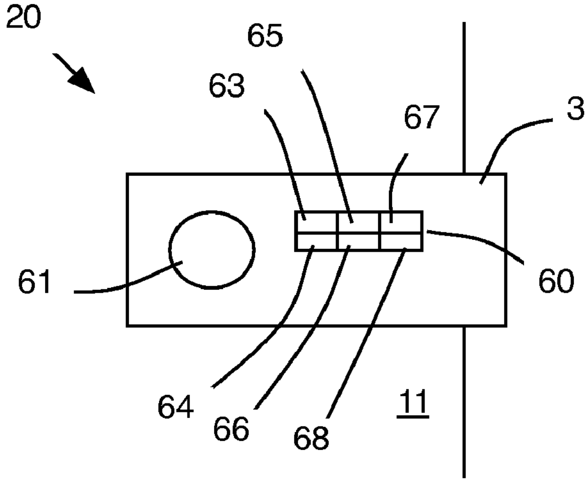
FIG. 6 is a back view of the embodiment of FIG. 4.

FIG. 3 illustrates the exterior face 11 of the stall door 1. On this side, the present invention 20 includes a shell 3 covering only a portion of the exterior of the stall door, the portion being sufficient to present a sensor and display 60 to patrons. FIG. 4, a top view of the present invention 20, illustrates a stall door 11 with the shell 3 surrounding the door, a portion of which extends to the exterior face, and a portion extending along the interior face of the door and a connecting segment, or flat plat that is wide enough to carry electrical communication signal wires from the interior portion of the shell to the exterior face, and yet slim enough to enable normal operation (opening/closing, and locking/unlocking) of the stall door.

Figure 2:
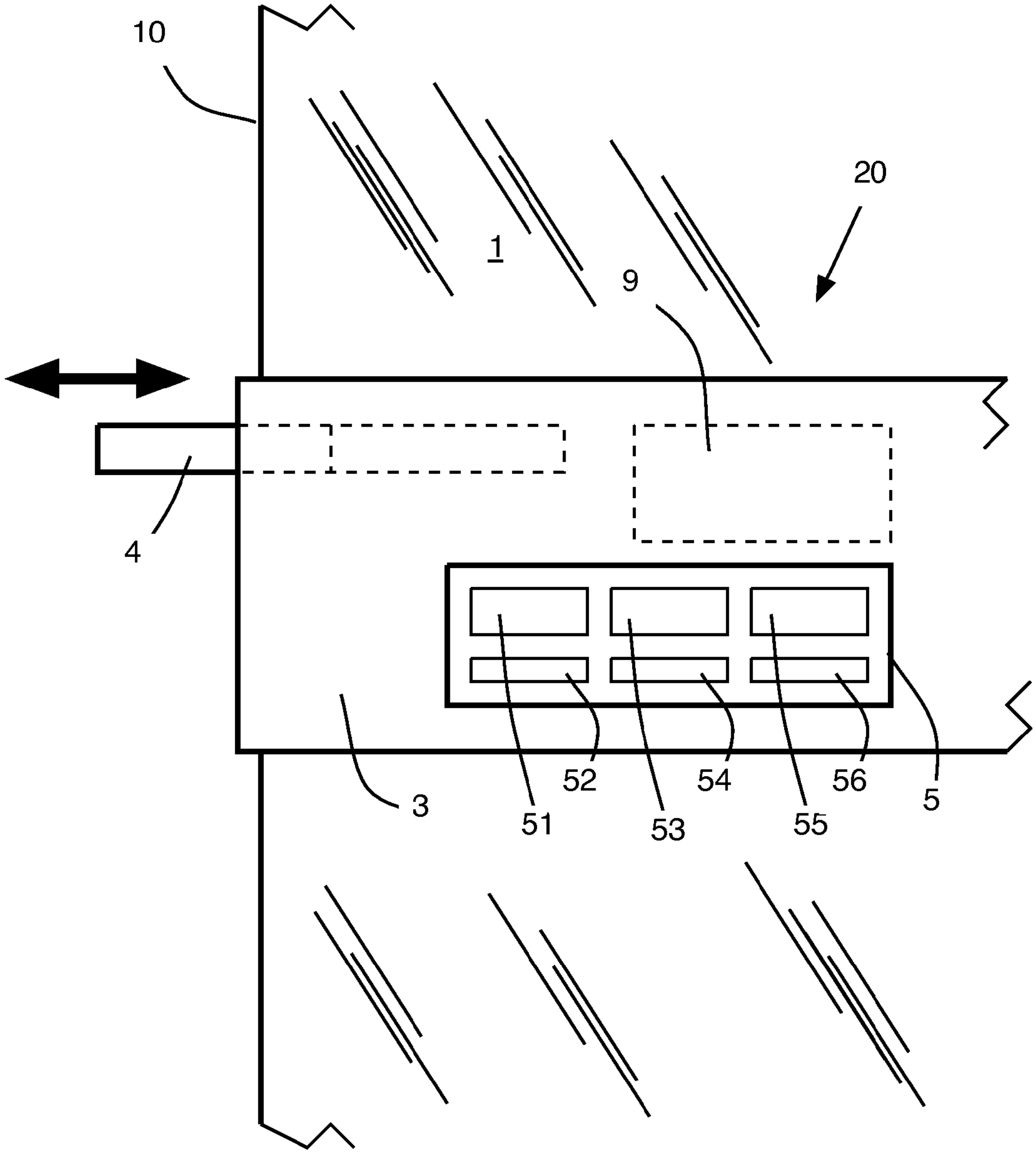
FIG. 2 is a detail view of section 2-2 of FIG. 1.

FIG. 2, a portion of the interior face 1 of the stall door 10, details a portion of the present invention 20 including the shell housing 3 having a display and sensor array 5. The housing further covers and holds therein a lock mechanism 4 and controller with power supply (commonly referenced by the single reference numeral 9 in FIG. 2). This controller and power supply, naturally, can be two separate units, such as a solid-state logic board and separate battery pack coupled by electrical wires for transferring power to the board and further in electrical communication with the various components as would be understood by those skilled in this art.

Making general reference to FIGS. 1-6, the combination sensor and display array 5 consists of three linearly arranged sensors 51 53 and 55 and three corresponding display LED indicator lights 52 54 and 55. Each sensor includes an infrared sending unit and a sensing eye tuned to that particular frequency of light whereby the proximity of a patron's hand causes the emitting light to reflect back to the sensor. Such a sensor is manufactured by PaCoSy Inc. of 75 Rue Stinson, Saint-Laurent, Quebec, H4N 2E1, Canada. The series of three sensors combined with logic instructions residing in memory in the controller 9 enables a patron to control the opening, closing, locking and unlocking of the door based on the direction of the movement of the patron's hand and based on other sensors determining whether the stall is occupied or available (as discussed, above).

Both the interior portion and exterior portion of the invention 20 include a manual override handle. On the inside of the stall, the shell 3 includes a handle 13 that mechanically connects to the lock pin and slides back and forth horizontally as the lock pin actuates from unlocked to locked and back. The handle is sufficiently large to allow a patron to grab hold slide the lock in the direction desired and pull or push the door to the desired open or closed position. On the exterior face, a handle 61 includes a key lock to isolate the handle from movement to prevent unwanted operation of the lock mechanism. However, in emergency or other situations, the restroom management can insert a key to enable exterior manual opening/closing/locking/unlocking of the stall door.

Also included on the interior portion of the shell, a occupied sensor 14 determines whether the stall is occupied by a patron. If so, a signal is sent to the controller causing the exterior LED to illuminate an occupied sequence (i.e. three red lights, or illuminating a back-lit text stating "occupied", or other known means of communicating that the stall is in use by a patron). Conversely, the same sensor 14, detecting that the stall is unoccupied, signals the controller to display a "vacant" signal to the exterior display 60.

Not shown in the drawing, however, as would be well-understood by those in this art, the conventional lock mechanism for bathroom stall doors typically comprises a simple bolt pin that slides or extends horizontally from an open position to a closed position. In the closed position, a cooperating mechanical fixture mounted to the stationary wall-portion of the stall receives a portion of the bolt pin, which prevents the door from swinging open. This is a very simple and affective design. The present invention includes an electro-magnet that, when charged, magnetically couples to the traditional lock pin, or a pin that is substantially similar in operation. So energized, the controller can then signal an actuator to move from a first position to a second position and thereby draw, by the magnetic coupling, the pin open. Simple mechanical transfer of motion is used to push the pin into the locked position.

Figure 7:
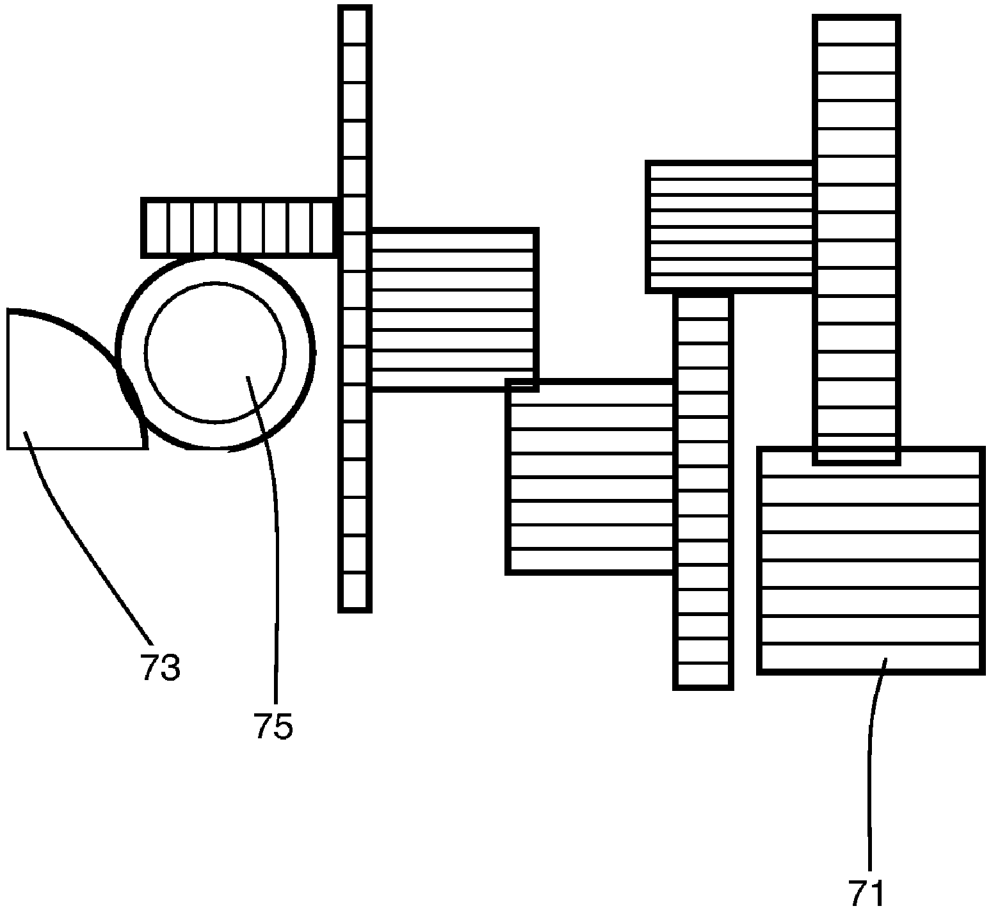
FIG. 7 is a partial view of section 7-7 of FIG. 1.

Because bathroom stall doors are relatively light-weight (compared to conventional doors), a simple opening mechanism and low-power motor is all that is needed to open the door. A simple DC motor coupled to a gear set (see FIG. 7) enables forward or reverse rotation of the motor spindle gear 71. This rotary motion in distributed through a gear-set to the door opening gear 75, which meshes with a similar gear on the door 73. To reduce the relative high-speed rotation of the motor at gear 71, a series of reduction gears disposed intermediate transfers the vertical-axis rotation to horizontal axis rotation and simultaneously reduces the speed to open and close the stall door coupled to gear 73 (not shown in the drawings). A clutch (not shown) enables a manual override of the door opening an closing with out engaging and damaging the motor.

Although the invention has been particularly shown and described with reference to certain embodiments, it will be understood by those skilled in the art that various changes in form and detail may be made without departing from the spirit and scope of the invention.

I claim:

1. An improved apparatus for automatically opening, closing, locking, and unlocking a swinging door, the improved apparatus comprising:

a first proximity sensor array comprising at least three linearly disposed sensors, each sensor further including a light-emitting-diode display device consisting of at least two colors, the first proximity sensor array arranging on a first side of the swinging door;

a second proximity sensor array comprising three linearly disposed sensors, each sensor further including a light-emitting-diode display device consisting of at least two colors, the first proximity sensor array arranging on a second side of the swinging door;

a first actuator in electrical communication with the first and second proximity sensor arrays and coupled to a locking mechanism, a second actuator in electrical communication with the first and second proximity sensor arrays and coupled to a door opening/closing mechanism;

a controller in electrical communication with the first and second proximity sensor arrays, the controller comprising a control logic sequence programming that enables a first sequence of signals received from at least one of the proximity sensor arrays to open the swinging door, a second sequence of signals to close the swinging door, a third sequence of signals to lock the door and a fourth sequence of signals to unlock the door;

and whereby the corresponding associated light-emitting-diode display device displays at least one color corresponding to the sequence of signals received by the controller; and a housing comprising a first shell segment arranged on the first or interior face of the door, the first shell segment encapsulating at least a portion of the controller, at least a portion of the locking mechanism and at least a portion of the first proximity sensor array, the housing further comprising a second shell segment, a portion of which nests inside the first shell segment to provide a horizontally extendable housing.

2. The apparatus of claim 1 further comprising:

a third proximity sensor in electrical communication with the controller, the third proximity sensor adapted to sense the presence of a patron using the bathroom stall.

3. The apparatus of claim 1 wherein the housing further comprises:

an exterior shell segment coupled to the first shell segment, the exterior shell segment arranging on the second side or exterior face of the door and further encapsulating at least a portion of the second proximity sensor array.

4. The apparatus of claim 1 further comprising:

a door-engaging gear set at least partially encapsulated by the housing and the gear set coupled to a DC motor, the DC motor in electrical communication with the controller.

5. A method for hands-free operation of a bathroom-stall door, the operation including open, close, lock, or unlock, the method comprising:

providing a first sensor array comprising three linearly aligned sensors arranged on a first side of the door, the first sensor array adapted to be encapsulated in a housing comprising a first shell segment arranged on an interior face of the door, the housing further comprising an exterior shell segment coupled to a first shell segment, the exterior shell segment arranging on an exterior face of the door;

providing a first display array comprising three linearly aligned light-emitting diode devices arranged to correspond with the first sensor array;

providing a second sensor array comprising three linearly aligned sensors arranged on a second side of the door and at least a portion of the second sensor array being adapted to be encapsulated in the exterior shell segment;

providing a second display array comprising three linearly aligned light-emitting diode devices arranged to correspond with the second sensor array;

providing a controller adapted to couple to the door, the controller in bi-directional communication with each sensor array and each display array;

providing a locking mechanism adapted to lock the stall door in response to a first predetermined sequence from the controller and adapted to unlock the stall door in response to a second predetermined sequence from the controller;

displaying a first color sequence on the first display array according to the lock status of the door; and providing an actuator adapted to open the stall door in response to a third predetermined sequence from the controller and to close the stall door in response to a fourth predetermined sequence from the controller.

* * * * *